Patented Mar. 10, 1942

2,275,865

UNITED STATES PATENT OFFICE 2,275,865

OIL SOLUBLE PHENOLIC RESIN AND METHOD OF MAKING SAME

Israel Rosenblum, New York, N. Y.

No Drawing. Application March 2, 1938, Serial No. 193,446

16 Claims. (Cl. 260—25)

The present invention relates to the production of synthetic resins, and more particularly of phenolic resins and combinations thereof with other resins and with glyceridic esters generally.

It is the general object of the invention to utilize the superior hardness, higher melting point, lighter color, and generally greater durability of hardened thermo-setting resins in the manufacture of oil-varnishes, and in particular to produce thermo-setting phenol-ketone-aldehyde resins which can be readily incorporated, and in relatively large proportions, in glyceridic esters, including fatty oils, and especially in glyceridic abietate or ester gum to yield stable homogeneous complexes suitable for use as or in coating compositions.

More particularly, it is the object of the invention to provide oil-soluble combinations of a thermo-setting phenolic condensate having chemically incorporated therein a ketone and also unusually high proportions of aldehyde, especially formaldehyde, the amounts of aldehyde ranging up to about 3 mols to each mol of phenol originally employed.

Phenolic resins having a relatively high proportion of aldehyde, and particularly those made with the lower phenols, such as phenol, cresol, and xylenol, are ordinarily marked by insolubility in varnish oils. They have, however, been employed for the hardening of natural resins and their ester gums, for they impart to the resulting resinous complex a higher melting point and greater durability, while on the other hand, the natural resin or ester gum, when present in sufficiently large preponderating proportions, keeps the phenolic resin in solution or suspension in varnish oils and in effect makes the phenolic condensate compatible with such oils.

Experience, however, has shown that not all phenol-aldehyde resins can be readily incorporated in ester gums. No difficulty is ordinarily encountered in the case of, for example, the novolaks, i. e., the permanently fusible condensates. The situation is, however, entirely different with, for example, condensates of phenol, formaldehyde and a ketone, such as acetone, or preferably of the reaction product of formaldehyde and the initial condensate of the phenol and, for example, acetone, whether the thermo-setting character is due to the specific phenol, the amount of aldehyde, the catalyst, or to other factors. These thermo-setting resins cannot be incorporated in molten ester gum without great difficulty, if at all, according to the usual commercial practice. When this is attempted, the phenolic resin is rapidly converted to the infusible condition even when a much larger proportion of ester gum is employed. As a rule, the phenolic resin reaches the gel condition and becomes infusible more quickly the greater is the proportion of formaldehyde. The incorporation of large proportions of formaldehyde in a phenolic condensate is, however, highly desirable because condensates of this character are distinguished by greater hardness, weather resistance, and general durability and impart these qualities to the mixed product.

Prior methods of incorporating varnish oil-insoluble phenol-formaldehyde condensates in ester gums have taken advantage of the fact that such condensates are generally more compatible with the acidic natural resin (colophony or rosin), which is neutralized with glycerol after the addition of the phenolic resin; or else special precautions were employed in the manufacture of the condensate or special phenols utilized. Thus, in the patent to Amann and Fenrobert, No. 1,623,901, the phenolic condensate is run into molten colophony, which is subsequently neutralized with glycerol at 250° C.; or else the condensation is conducted in the presence of colophony and is followed by neutralization. It will be noted that in Example 5 of this patent the condensate of phenol, acetone and formaldehyde must be carefully added, and in small portions, to as much as six times its own quantity of melted colophony in spite of the fact that the molecular proportion of formaldehyde as set forth in Example 2, wherein the phenol-formaldehyde resin is similarly run into colophony, is very low. This care must be exercised, and relatively low temperatures used, even though colophony, as above stated, mixes more readily with phenolic resins than does ester gum.

In the patent to Honel, No. 1,800,295, it is stated that it is "entirely new to work up neutralized, namely esterified colophony, or more or less natural resins, with similar products" (page 2, lines 84–87) and suggests for this working up the use of phenol-formaldehyde resins made with relatively expensive p-tertiary butyl and amyl phenols and p-benzyl phenol, the condensation of the phenol and aldehyde being, moreover, effected under special conditions, such as low temperatures, and the presence of large amounts of alkali followed by precipitation with acid, while the condensate is described as being oily or non-resinous prior to incorporation in an ester gum. In Patent No. 1,800,296 to Honel, it is stressed that the phenolic condensate is of low molecular weight, being oily in nature and produced at room temperature, the reaction being an extremely slow one.

I have found that phenol-ketone-aldehyde condensates of the heat-indurable type and especially those made with high molecular proportions of aldehyde, and which cannot ordinarily be taken up by ester gums, at least not without great difficulty, can be made readily compatible with such gums and in unusually high proportions by producing the condensate in the presence of a terpenic material. The terpenic material (by which term I include not only terpene hydrocarbons, but also the oxygen-containing and other derivatives of the hydrocarbons, including the alcohols and the halides, and in general the substances, singly and in admixture, obtainable from wood rosin, and their derivatives) have been found by me to convert the condensates which would otherwise be incompatible with an ester gum, or at least not readily miscible therewith, into products which are quite easily taken up by ester gums, the mixture being soluble in or forming stable combinations with varnish oils. This solubilizing action is particularly marked in the case of phenolic condensates produced with as high as 3 molecular proportions of aldehyde to each mol of original phenol, in addition to a considerable amount of ketone, with which the phenol may be initially reacted.

The solubilizing action of the terpenic material cannot be said to be due to the physical action of a common solvent, for the final products obtained by me do not contain any considerable proportions of free terpene, since practically all of the volatile material has been expelled therefrom; and the resins can be made quite solid at room temperature even though the terpenic material is all liquid. It appears rather that the terpene has entered into chemical combination with the phenol or phenolic condensate; in fact, the terpenic material may be reacted with the phenol or with the phenol-ketone condensate in the presence of suitable catalysts, such as hydrochloric acid, acid-reacting chlorides, sulphuric acid, etc., whereby, a considerable part thereof becomes chemically combined with the phenol nucleus.

The ester gum may be substantially neutral, that is, prepared with equivalent quantities of rosin and polyhydric alcohol, or the polyhydric alcohol may be employed in excess, the product thus containing also the partial ester or esters of the alcohol.

The invention will be further described by way of illustration in the following examples describing specific procedures for carrying out the same.

Example 1

| | |
|---|---|
| Diphenylolpropane | 228 parts (1 mol) |
| 40% CH₂O solution | 450 parts (6 mols) |
| Pine oil | 220 parts |
| Zinc acetate | 1 part | are reacted by heating for twelve hours under reflux, or at somewhat higher temperature under pressure for a shorter period of time or until an initial resinous condensate is produced. The mass is then dehydrated by heating in a current of inert gas, the temperature being permitted to rise to 120° C. and being kept at such value for a short time. There is obtained a plastic resin which contains about 45% of phenolic condensate, 45% pine oil and about 10% of unreacted formaldehyde and diphenylolpropane. The material is thermo-setting and on further heating to a higher temperature becomes insoluble and infusible.

The dehydrated resin is soluble in varnish oils and in natural and synthetic resins, and particularly in ester gums, especially one having a large proportion of glycerol mono- and di-abietates. The phenolic resin, in spite of its extremely hight proportion of formaldehyde and its thermo-reactivity, can be incorporated in relatively large proportion in ester gum. Thus to produce a modified ester gum containing, for example, 20% of solid phenolic resin, 100 parts of the above described dehydrated product are introduced gradually into 180 parts of ester gum heated to a temperature of 250° C. After the condensate has all been added, the heating is continued until substantially all volatile material, especially uncombined components of the pine oil, has been expelled.

In this manner there is obtained a resin which is practically neutral (acid number 10 or less), has a relatively high melting point (about 115° C.) and a very high molecular weight, is stable and alkali- and weather-resistant, and is highly suitable for the preparation of varnishes and other coating compositions, either alone or in conjunction with other film-forming materials.

The diphenylolpropane is prepared in known manner by reacting approximately 1 mol of acetone with two mols of phenol with the aid of a strong acid, such as hydrochloric.

Example 2

The materials, procedure and proportions described in Example 1 are followed except that only 3 mols of formaldehyde (i. e. 225 parts of the 40% solution) are employed. The condensate obtained is not so extreme in its thermo-setting properties, although on heating it, too, is converted into the infusible condition. The phenolic resin is highly compatible with ester gum and can be incorporated in the latter up to 50% and even more without danger of conversion to the infusible state, the product being soluble in varnish oils and in the common varnish solvents. A similar condensate made without pine oil cannot be incorporated at all into ester gum, becoming infusible in the heated ester gum mass without even being taken up by the latter in any considerable proportions; such a condensate is, moreover, insoluble in varnish oils.

Example 3

| | |
|---|---|
| Diphenylolpropane | 228 gms. (1 mol) |
| 40% CH₂O solution | 450 gms. (6 mols) |
| Turpentine | 300 gms. |
| Zinc acetate | 1.5 gms. | are reacted in the manner indicated in Example 1, the dehydrated product being a plastic material which contains about 50% of phenolic resin, the remainder being for the most part free turpentine. This condensate is thermo-setting, but is soluble in oils and in other resins and is suitable for the "hardening" of ester gum, i. e. for making modified ester gums of high melting point and increased weather resistance and resistance to chemical attack.

Example 4

If a brittle resin is desired, possessing thermosetting properties and as such usable for raising the melting point of an ester gum to a considerable extent, part of the liquid terpene material in the initial condensation in the above examples is replaced by rosin or ester gum (which are also terpene derivatives) so that, on dehydration, a brittle resin is obtained. Of course, in calculating the addition to ester gum at high temperature this original dilution with rosin or ester gum should be taken into account. Thus,

| | |
|---|---|
| Diphenylolpropane | 228 parts (1 mol) |
| 40% CH₂O solution | 225 parts (3 mols) |
| Ester gum | 75 parts |
| Pine oil | 150 parts |
| Zinc acetate | 1 part | may be reacted as described in Example 1, and yield a thermo-setting resin, brittle at room temperature; the quantity of ester gum (or rosin) constituting only a minor part of the final resin, that is, less than half of the total resin. With this product ester gum can be modified by fusing the two at high temperatures (200–250° C.) to yield a harder resin containing as high as 25% phenolic condensate, the compound resin being soluble in varnish oils, including China-wood, linseed, perilla, sunflower oil and other usual vehicles.

In place of the diphenylolpropane any other suitable condensation product of a phenol and a ketone may be employed, such as the condensates of cresols, xylenols, the higher phenol homologues such as butyl and amyl phenols, with acetone, methyl acetone, methyl ethyl ketone, diacetone alcohol, cyclohexanone, acetophenone, etc.

While I have found that zinc acetate and other organic compounds of zinc, such as the abietate, stearate, and other soaps are highly satisfactory catalysts, particularly as the zinc compounds in the final product are water-insoluble and appear to be uniformly incorporated in the resin, other catalysts may be employed including the acid, basic and the neutral inorganic and organic substances, or combinations of different catalysts used in succession, as is well known in the art. Where the catalyst is or forms a water soluble material, it may be washed out before the dehydration of the condensation product.

Under the conditions of the reactions above described, the terpenic materials, by which term I include not only terpenic hydrocarbons, but also oxygen-containing terpenes and other terpenic derivatives, have the effect of arresting the conversion of the phenolic condensate to the insoluble, infusible state, not by reason of any diluting action, but rather by the formation of new compounds, part of the terpenic material entering into the chemical reaction and not being expellable even at temperatures far above their normal boiling points. These terpene-containing complexes are generally characterized by oil solubility, even though the condensates made without the terpenic material are oil-insoluble and are rapidly converted to the totally insoluble, infusible condition; and they have a higher degree of oil-solubility or compatibility when the condensate would otherwise have a certain degree of oil compatibility. While ordinarily this oil-solubilizing action is possessed to a marked degree only by the higher boiling terpenic materials, such as dipentene, terpineol, borneol, and other such hydrocarbons and alcohols boiling above 170° C., I have found that in association with the condensate of an aldehyde and the reaction product of a phenol and a ketone, even turpentine has a decided arresting action on the conversion of the resin to the infusible condition even when the aldehyde ratio is greater than 1½ mols to 1 mol of original phenol, a property which it does not display toward a condensate of ordinary phenol and formaldehyde to any notable extent. These terpenic materials can be employed either individually, in their commercial forms and grades, as in the form of products consisting primarily of dipentene, terpineol or other terpenic substance, especially those boiling above the boiling point of turpentine, or they may be employed in the form of mixtures, as in pine oil.

In all of the above examples, the ester gum may be replaced by the glyceridic ester of copal resin or other esterified acidic natural resin.

Certain of the condensates of the phenol-ketone reaction product, aldehyde, and terpenic material produced as above described are soluble in varnish oils, and may be incorporated into such oils directly, that is, without the intermediary of ester gum.

The resins described hereinabove yield solutions of high viscosity and have a limited solubility in petroleum thinners, like mineral spirits. The varnishes yield films of good body and highly satisfactory color retention. The varnishes are in general characterized by non-penetration, that is, when applied to porous surfaces, they do not enter the pores to any considerable extent.

Resins prepared as hereinabove described are capable of incorporation in ester gums in unusually large proportions, as much as 50%, and even more by weight of the ester gum, even when the ratio of formaldehyde to phenol is unusually high, for example, 1½ to 3 mols of formaldehyde to 1 mol of phenol originally employed to combine initially with the ketone. The invention is, however, not limited to the use of unusually high proportions of formaldehyde.

While I prefer to conduct the process in two stages, that is, the condensation of the phenol and ketone in the presence of a strong acid in one stage, followed by the condensation of this reaction product with the aldehyde in the presence of the terpenic material in the second stage, various orders of reaction may be employed; thus, the terpenic material may be reacted first with the phenol, or with the phenol-ketone condensate, with or without the presence of a catalyst, such as hydrochloric or sulphuric acid or an acidic metal chloride, like zinc and aluminum chloride, or it may be added to the other reacting materials at any stage of the process.

While other aldehydes may be employed in place of all or part of formaldehyde, the latter has been found to give the most satisfactory results. The present application is a continuation-in-part of my co-pending applications Ser. Nos. 538,248, filed May 18, 1931; 580,495 filed December 11, 1931, 594,379, filed February 20, 1932, and 628,298, filed August 11, 1932.

I claim:

1. The method of producing a high molecular weight, thermo-setting phenolic resin which is capable of being incorporated in glyceridic esters in relatively high proportion, which comprises reacting a phenol, a ketone, formaldehyde and a terpenic material of the group consisting of terpene hydrocarbons and terpene alcohols in any order until a fusible condensate is obtained, the molecular proportion of formaldehyde to phenol being at least 1½:1.

2. The method according to claim 1 wherein the phenol is first reacted with the ketone and then with the formaldehyde and terpenic material.

3. The method according to claim 1 wherein the formaldehyde is employed in the proportion of approximately 3 mols to each mol of original phenol.

4. The method according to claim 1 wherein the original phenol has no higher substituting group than methyl.

5. The method of producing combinations of a phenol-ketone-aldehyde resin and an ester gum which are soluble in varnish oils, which comprises reacting a phenol of the type which forms oil-insoluble resins with an equimolecular or greater proportion of formaldehyde, with a ketone and formaldehyde in the presence of a terpenic hydrocarbon boiling above 170° C. and capable of combining with a phenolic material, until an at least semi-solid resinous product is obtained, the molecular proportion of formaldehyde to phenol being at least 1½:1, and then mixing such resin with an ester gum and heating the mixture until a homogeneous mass is obtained.

6. The method of producing combinations of a phenol-ketone-aldehyde resin and an ester gum which are soluble in varnish oils, which comprises reacting a phenol of the type which forms oil-insoluble resins with an equimolecular or greater proportion of formaldehyde, with a ketone and formaldehyde in the presence of a terpenic material consisting primarily of a terpene alcohol until an at least plastic resinous product is obtained, and then mixing such resin with an ester gum and heating the mixture until a homogeneous mass is obtained.

7. The method of producing combinations of a phenol-ketone-aldehyde resin and an ester gum which are soluble in varnish oils, which comprises reacting a phenol of the type which forms oil-insoluble resins with an equimolecular or greater proportion of formaldehyde, with a ketone and formaldehyde in the presence of a terpenic material consisting primarily of terpineol, until an at least plastic resinous product is obtained, and then mixing such resin with an ester gum and heating the mixture until a homogeneous mass is obtained.

8. The method of producing combinations of a phenol-ketone-aldehyde resin and an ester gum which are soluble in varnish oils, which comprises reacting a phenol of the type which forms oil-insoluble resins with an equimolecular or greater proportion of formaldehyde, with a ketone and formaldehyde in the presence of pine oil until an at least plastic resinous product is obtained, and then mixing such resin with an ester gum and heating the mixture until a homogeneous mass is obtained.

9. The method of producing an ester gum modified by a relatively large proportion of a thermo-setting phenolic resin, which comprises reacting approximately one mol of diphenylolpropane, three mols of formaldehyde and a quantity of pine oil of the order of the weight of the diphenylolpropane in the presence of a catalyst at approximately the boiling point of the mixture, dehydrating the condensate and running the condensate into an approximately equal weight of the molten ester gum, and finally heating the mixture at temperatures above 200° C. to expel volatile material.

10. The method of producing a thermo-setting phenolic resin which is solid at room temperature but is miscible with ester gum at elevated temperatures, comprising reacting diphenylolpropane, formaldehyde, and a terpenic material in quantity of the order of the weight of the diphenylolpropane and consisting of a mixture of a liquid terpenic substance and an amount of a member of the group consisting of rosin and ester gum of the group consisting of terpenic hydrocarbons and terpene alcohols sufficient to make the condensate solid at room temperature but constituting a minor part of the final resin, in the presence of a catalyst which favors the production of heat-indurable phenolic resins, the molecular proportion of formaldehyde to diphenylolpropane being at least 3:1.

11. A resinous phenolic condensate which is thermo-setting in character, yet capable of being incorporated in relatively high proportion in oily and resinous glycerol esters, comprising the reaction product, in any order, of a phenol, a ketone, formaldehyde and a terpenic material of the group consisting of terpene hydrocarbons and terpene alcohols, the molecular proportion of formaldehyde to phenol being at least 1½:1.

12. A resinous phenolic condensate, which is thermo-setting in character, yet capable of being incorporated in relatively high proportion in oily and resinous glycerol esters, comprising the reaction product, in any order, of a phenol having no higher hydrocarbon substituent than methyl, acetone, formaldehyde and a terpenic material of the group consisting of terpene hydrocarbons and terpene alcohols, the molecular proportion of acetone and formaldehyde on the one hand, and of the phenol on the other, being at least about 2:1.

13. A resinous phenolic condensate which is thermo-setting in character, yet capable of being incorporated in relatively high proportion in oily and resinous glycerol esters, comprising the reaction product, in any order, of diphenylolpropane, formaldehyde, and a terpenic hydrocarbon, the molecular proportion of formaldehyde to diphenylolpropane being at least 3:1.

14. A resinous phenolic condensate which is thermo-setting in character, yet capable of being incorporated in relatively high proportion in oily and resinous glycerol esters, comprising the reaction product, in any order, of diphenylolpropane, formaldehyde, a compound of zinc, and a liquid terpenic material of the group consisting of terpene hydrocarbons and terpene alcohols, the moecular proportion of formaldehyde to diphenylolpropane being at least 3:1.

15. An ester gum having incorporated therein at least 20% of a thermo-setting condensate of diphenylolpropane, formaldehyde, and a terpenic material of the group consisting of terpene hydrocarbons and terpene alcohols, the molecular proportion of formaldehyde to diphenylolpropane being at least 3:1.

16. A resinous phenolic condensate which is solid at room temperature and is thermo-setting in character, yet is capable of being incorporated in relatively high proportion in oily and resinous glycerol esters, said condensate comprising the reaction product of (1) a condensate of a phenol and a ketone, (2) formaldehyde, and (3) a terpenic material in quantity of the order of the weight of the phenol-ketone condensate and consisting of a mixture of a member of the group consisting of terpene hydrocarbons and terpene alcohols, with enough of a member of the group consisting of rosin and ester gum to make the product solid at room temperature, but constituting a minor part of the final resin, the molecular proportion of formaldehyde to phenol being at least 1½:1.

ISRAEL ROSENBLUM.